Nov. 25, 1947.   T. F. STACY   2,431,349
INJECTION MOLDING DEVICE
Filed April 19, 1943

INVENTOR
Thomas F. Stacy
BY
Parker Prochnow & Farmer
ATTORNEYS

Patented Nov. 25, 1947

2,431,349

UNITED STATES PATENT OFFICE 2,431,349

INJECTION MOLDING DEVICE

Thomas F. Stacy, Piqua, Ohio, assignor to The French Oil Mill Machinery Company, Piqua, Ohio Application April 19, 1943, Serial No. 483,556

7 Claims. (Cl. 18—30)

This invention relates to molding and more particularly to what is known as "injection molding," by which a liquid molding material is injected into a cavity of a mold where the material hardens.

The hardening of such molding material is commonly caused or accelerated by the addition to the molding material of a suitable agent, and such agents, in some instances are called hardening accelerators or catalysts. It is very desirable that the time for hardening of the molding material within the cavity of the mold be reduced as much as possible in order to increase the possible output of molded articles by the use of any mold. Heretofore, the addition of hardening or accelerating agents or catalysts in substantial proportions to liquid molding materials raised the serious danger of rapid hardening of the molding material before the cavity could be entirely filled, and the difficulty of obtaining a uniform mixing by the hardening agent with the resin or molding material.

An object of this invention is to provide apparatus for improving the molding of resinous articles, particularly from the so-called plastic materials; with which a more effective mixing of the resin with the hardening agent, accelerator or catalyst may be obtained before the molding material reaches its final position in the mold cavity; with which relatively large amounts of a hardening agent, accelerator or catalyst may be added to the molding material without danger of the molding material setting prematurely; with which danger of plugging of the molding apparatus through unintended hardening of the mixture will be avoided; with which the passages through which the materials flow to the mold cavity may be cleared of any hardened molding material when the injection nozzle is removed and the die is opened to remove the molded articles; and which will be relatively simple, practical, efficient, compact and inexpensive.

Other objects and advantages will be apparent from the following description of two embodiments of the invention, and the novel features of the invention will be particularly pointed out hereinafter in connection with the appended claims.

In copending application Serial No. 418,640, filed November 12, 1941, two different streams of liquid material are discharged through separate passages at the convex end of an injection nozzle into a common sprue that carries the combined streams to the mold cavity. Apparatus of that type for delivering two separate streams of liquid simultaneously and in proportionate amounts through a common nozzle may be employed in the present instance to deliver a stream of liquid molding material and a separate and proportional stream of a hardening agent, accelerator or catalyst which, when mixed with the molding material, will cause or accelerate the hardening of such molding material within a short interval of time when the mixture is within the mold cavity. It will be understood, however, that reference to said copending application is made only by way of example of one form of apparatus that may be employed for delivering simultaneously two proportional streams of liquids, one for resin and the other for the hardening agent, and that other suitable apparatus for accomplishing this purpose may also be employed.

Figure 1:
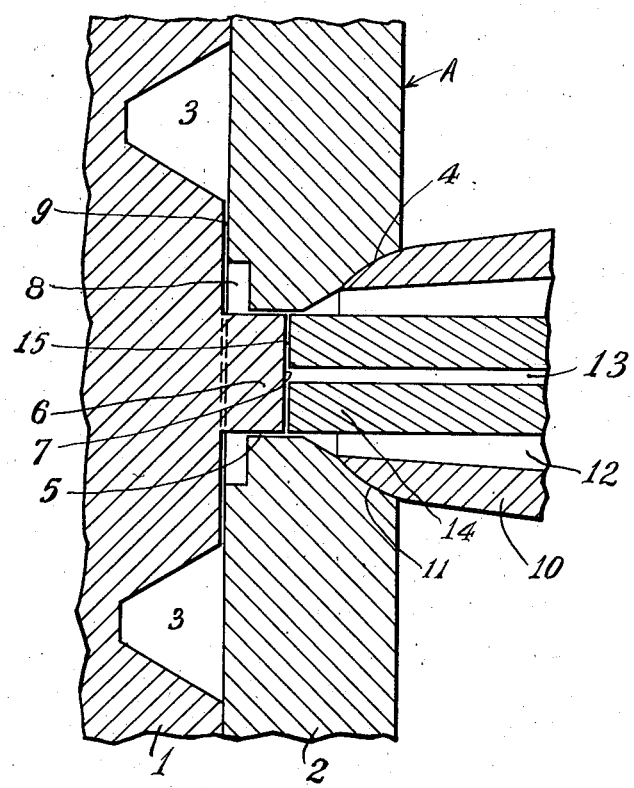
Fig. 1 is a sectional elevation through a mold and an injection nozzle in operative relation to the mold, and illustrating one example of apparatus for practicing the invention.

Referring now to Fig. 1, the body of mold A is formed of two sections 1 and 2, disposed face to face and removably clamped together, as usual with divided molds for the molding of plastic resins and similar materials. The mold body is provided with a mold cavity 3 of suitable size and configuration which opens into the parting face between the mold sections 1 and 2, so that after an article has been molded in a cavity, the separation of the sections 1 and 2 will expose the article for removal from the mold. One of the mold sections, such as the section 2, is also provided with a seat 4 in its outer face which is connected with the cavity 3 by a sprue 5 extending from the seat 4 through the section 2 to the parting line between the mold sections, and then along the parting line to the cavity 3. The mold section 1 is provided with a projecting post 6 which extends from the parting line or abutting face of the section 1 telescopingly into the sprue 5 towards the seat 4, and the periphery of this post 6 is spaced slightly from the peripheral wall of the section of the sprue 5 into which it extends, so as to provide a tubular passage from the seat 4 along the side of the post to the base thereof.

The free end face 7 of the post 6 forms one portion of the seat which, in this example, is a concave seat or recess in the outer face of the section 2. One or both of the mold sections, such as the section 2, is provided around the base of the post 6 with an annular chamber 8 into which the tubular sprue passage surrounding the side wall of the post 6 opens in a direction along the peripheral side wall of the chamber 8. The portion 9 of the sprue between the mold cavity 3 and the chamber 8 opens into this chamber 8 in a direction along another wall of the chamber 8, or at a distance from the opening into that chamber of the tubular part of sprue 5. In other words, the portions or zones of the sprue 5 which open into the chamber 8 open into that chamber in directions along different wall portions of that chamber, in different directions and at spaced peripheral zones of that chamber, to form a whirlpool, so that the molding liquid passing along the tubular part of the sprue will, in entering the chamber 8, swirl or eddy therein before it passes out through the section 9 of the sprue to the mold cavity 3. In other words, the abrupt change in direction of flow of the molding material after it enters the chamber 8 will cause it to swirl or eddy in seeking the outlet from that chamber which leads to the mold cavity.

The injection nozzle 10 is provided with a peripheral contact surface zone 11 which engages with a similar peripheral zone of the seat 4 adjacent the outer face of the section 2, and this peripheral contact definitely seals the nozzle 10 to the mold at the seat 4, when the nozzle is forced against said seat. The contact zone of the seat 4 which is engaged by the nozzle 10 is between the entrance end of the sprue and the outer face of the section 2, so that any liquids delivered by the nozzle 10 must pass into the sprue 5. The nozzle 10 is provided with a relatively large passage or channel 12 through which a molding liquid, such as a plastic resin in liquid or fluid form, may be delivered to the entrance end of the sprue 5. The nozzle 10 also has therein a smaller and separate channel or passage 13 through which the resin hardening agent, accelerator or catalyst in liquid form may be delivered to the sprue 5, proportionally and simultaneously with the delivery of the liquid resin through the passage 12.

The central core 14 of the nozzle which separates the passages 12 and 13, preferably extends somewhat beyond the end of the passage 12 into close proximity to but slightly spaced from the free end face 7 of the post 6, so as to form with that free end face of the post 6, a relatively thin but broad passage 15 which connects the discharge end of the passage or channel 13 of the nozzle with the entrance end of the sprue 5 or the extension of the sprue 5 into the seat 4. The seat 4, between the contact zone which engages the nozzle 10 and the entrance to the sprue 5, is convergingly tapered or restricted, so that the liquid resin discharged by the passage 12 of the nozzle 10 will be attenuated or formed into a tubular, relatively thin walled stream of resin which passes along the sprue 5 surrounding the post 6 and into the chamber 8.

In this particular example, the end face 7 of the post 6 terminates a short distance from the entrance to the sprue 5, and the end of the core 14 of the nozzle which may be of the same diameter as the post 6, also extends telescopingly into the entrance end of the sprue 5, so that the stream of resin discharged by the channel 12 of the nozzle is formed into a tubular, cylindrical, thin, shell-like stream before it passes the free end of the core 14. The passage 15 between the abutting end faces of the core 14 and the post 6, therefore opens into the sprue 5 in a direction at right angles thereto, so that the relatively thin, broad stream of liquid molding resin moving along the sprue 5 will be intersected by a relatively thin, broad, flat stream of the hardening agent, accelerator or catalyst which is discharged by the channel 13 of the nozzle and delivered along the passage 15 into the sprue 5 at right angles to or crosswise of the direction of flow of the tubular stream of resin.

This abrupt and angular intersection of these two relatively thin, broad streams of liquid will cause a relatively thorough and uniform distribution of the hardening agent, accelerator or catalyst throughout the liquid resin, and as this liquid mixture moves along the sprue 5, it will enter the chamber 8 in a direction along a wall thereof, or generally tangentially thereof and swirl in the chamber 8 before reaching and passing into the sprue section 9 which leads from the chamber 8 to the mold cavity 3. This ensures a thorough and uniform mixture of these two streams before they reach the mold cavity.

The thickness of the film or stream delivered through the passage 15 between the abutting end faces of the core 14 and post 6, one of the tubular streams passing along the outer periphery of the core 14 in the sprue 5, may be made very small in order to insure a uniform or adequate mixing of the two streams. This thinness may be to any extent desired, and these streams may, for example, have a thickness of .010 inch, or even .005 inch. The sprue section 9 may also be made of any desired degree of thinness in order to insure adequate mixing of the two streams before they reach the mold cavity 3.

Figure 2:
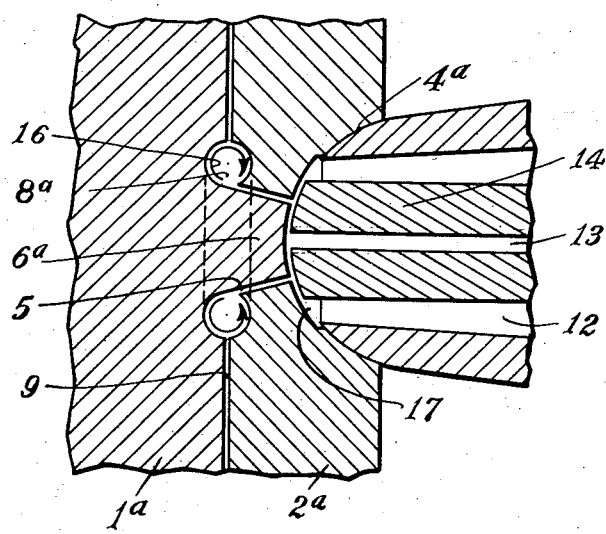
Fig. 2 is a similar sectional elevation, but showing a slight modification of the apparatus.

In the embodiment of the invention illustrated in Fig. 2, the arrangement is generally similar to that shown in Fig. 1, except that the chamber 8a, which corresponds to the chamber 8 of which I, is made approximately one-half in the mold section 1a and one-half in the mold section 2a. The chamber 8a is of generally annular form and circular in radial cross section. This places the line of part between the mold sections approximately in the plane of the longitudinal annulus axis of the chamber 8a, so that when the mold is opened, by separation of the sections, the hardened mixture in the chamber 8a may be easily removed from that chamber. This avoids any undercut anchorage of any hardened resin within the chamber 8a. The post 6a which corresponds to the post 6 of Fig. 1, instead of being cylindrical along its outside periphery, may if desired, be frusto conical, and the tubular portion of the sprue opens into the chamber 8a in a direction generally tangential to the radial cross section of the chamber 8a, which causes the entering mixture to swirl in the direction shown by the arrow 16 in Fig. 2. The section 9 of the sprue, which leads from the chamber 8a, in this instance will preferably open at approximately right angles to a tangent to the radial cross section, which may increase the tendency of the entering liquid to swirl before it finds the outlet therefrom into the sprue section 9 which leads to the mold cavity 3.

In this particular example, the entire seat area 4a may be generally arcuately concave and the central area of this seat may be further slightly recessed, as at 17, to provide between it and the end of core 14 of the nozzle, the relatively thin passage connecting the nozzle channels 12 and 13 with the sprue 5. The end face of the core 14 in this instance overlies the entrance to the sprue 5, so that the thin, broad annular stream of resin delivered to the channel 12 of the nozzle and the correspondingly shaped thin stream of the hardening agent, accelerator or catalyst delivered through the channel 13 of the nozzle will intersect head on while flowing in opposite directions and then undergo an abrupt practically right angle change in direction as the mixture of streams enters the sprue 5. The end face of the core 14 is of course spaced slightly from the bottom of the shallow recess 17 and the end face of the post 6a, so that the two streams will be attenuated or converted into relatively thin, broad streams before they intersect and pass along the sprue to the mold cavity.

It will be understood that various other changes in the mold body and in the nozzle may be made in order to attenuate or draw out the streams into relatively thin, flat, broad streams which intersect and merge along lines generally crosswise of the direction of flow of the streams at the time of intersection, so as to obtain a thorough mixing by reason of the intersection of the streams. This mixing is then increased by the flow along the sprue 5, through the chambers 8 or 8a and thence along the thin sprue sections 9 to the mold cavity 3.

It is believed that the operation of the device will be clear from the foregoing description, and it will be understood that after the mold cavity has been filled with streams of the molding material or resin with the agent added thereto, and the mixture has hardened, the nozzle will be removed from the mold and the mold sections then separated to remove the hardened molded article. It will be particularly noted that all of the passages through which the resin and agent flow, after junction, to the mold cavity, will be exposed by a separation of the nozzle from the mold and the separation of the mold into its sections, so that all hardened material in these passages may be easily and quickly removed therefrom. This eliminates danger of the different passages becoming plugged by hardened molding material, since all hardened material is removed by the mere act of removing the molded article.

It will be understood that various changes in the materials, details and arrangement of parts, which have been hereindescribed and illustrated in order to disclose two examples of the invention, may be made by those skilled in the art within the principle and scope of the invention as expressed in the appended claims.

I claim as my invention:

1. In injection molding apparatus, a mold having a cavity and a passage leading thereto, said passage being annular in cross section in one zone thereof, means for delivering to the outer end of said passage, a stream of molding material in liquid form, and means for progressively delivering to said passage in said zone, peripherally therearound, an agent for accelerating the hardening of said molding material.

2. In injection molding apparatus, a mold body having therein a molding cavity the body being divided, through said cavity, into separable parts to provide for access to said cavity to remove molded objects, said body having a seat on the outer face of one of said parts and a sprue leading from said seat to said cavity, said sprue having a relatively broad, thin intermediate portion adjacent its entrance end and adjacent said seat, and a nozzle engageable along a peripheral area of its end face against said seat and exteriorly of said entrance end of said sprue, and having two separate conduits for different materials enclosed by said peripheral area and discharging through said end face towards said body, the portion of the end face of said nozzle between the discharge ends of said conduits being spaced slightly from the adjacent face of said one part of said body to form, with the latter, a thin, relatively broad space connecting the discharge ends of said conduits, in the area encircled by said seat, to each other and to said entrance end of said sprue.

3. In injection molding apparatus, a mold body having therein a molding cavity, said body being divided, through said cavity, into separable parts to provide for access to said cavity to remove molded objects, said body having a seat on the outer face of one of said parts and a sprue leading from said seat to said cavity, the other of said parts, along said division between parts, having a post projecting towards said seat into a recess in the adjacent face of said one part, but spaced from the walls of said recess with the space between said post and recess wall forming part of said sprue, said sprue being relatively broad at its entrance end adjoining said seat, and a nozzle engageable along a peripheral strip area of its end face against said seat and exteriorly of said entrance end of said sprue, and having two separate conduits for different materials enclosed by said strip area and discharging through said end face towards the end face of said post, the portion of the end face of said nozzle between the discharge ends of said conduits being spaced slightly from the adjacent face of said post to form, with the latter, a thin relatively broad space connecting the discharge ends of said conduits to each other and to said sprue.

4. In injection molding apparatus, a mold body having therein a molding cavity, said body being divided through said cavity into separable parts to provide for access to said cavity to remove molded objects, said body having a seat on the outer face of one of said parts and a sprue leading from said seat to said cavity, the other of said parts having a post extending into and along a portion of said sprue towards the entrance end of the latter, the periphery of said post being spaced from the periphery of said sprue to provide a portion of the sprue passage, said sprue having another portion thereof extending from adjacent the base of said post along the plane of separation of said parts, to said cavity, and a nozzle having a peripheral zone of its end face engaging against and removable from said seat encircling the entrance end of said sprue, said nozzle having separate internal passages opening through the portion of its end face encircled by said peripheral zone, said end face having at least a portion thereof between the discharge ends of said nozzle passages and between said passages and the entrance end of said sprue, spaced from said post to provide a channel connecting said sprue and said nozzle passages and exposed by separation of said nozzle from said mold.

5. In injection molding apparatus, a mold body having therein a molding cavity and divided through said cavity into separable parts to provide for access to said cavity to remove molded objects, said body having a seat on the outer face of one of said parts and a sprue leading from said seat to said cavity, one of said parts having a post extending into and along a portion of said sprue towards the entrance end of the latter, the periphery of said post being spaced from the periphery of said sprue, said sprue having another portion thereof extending from adjacent the base of said post along the surface of separation of said parts to said cavity, and a nozzle having a peripheral zone of its end face engaging against and removable from a zone of said seat encircling the entrance end of said sprue, said nozzle having separate passages opening through the portion of its end face encircled by said peripheral zone, said end face having at least a portion thereof between the discharge ends of said nozzle passages and between said passages and the entrance end of said sprue, spaced from said post to provide a channel connecting said sprue and said nozzle passages and exposed by separation of said nozzle from said mold, said body also having therein at the surface of part and around the base of said post, a chamber of greater cross sectional area than the adjoining zones of said sprue, through which streams of fluid from the passages of said nozzle must pass in moving along the sprue to said cavity to increase mixing of said streams before they reach said cavity.

6. In injection molding apparatus, a mold body having therein a molding cavity and divided through said cavity into separable parts to provide for access to said cavity to remove molded objects, said body having a seat on the outer face of one of said parts and a sprue leading from said seat to said cavity, one of said parts having a post extending into and along a portion of said sprue to the entrance end of the latter, and with its end face facing outwardly along said sprue, the periphery of said post being spaced from the periphery of said sprue, said sprue having a portion thereof extending from adjacent the base of said post along the surface of separation of said parts to said cavity, and a nozzle having a peripheral zone of its end face engaging against and removable from said seat encircling the entrance end of said sprue, said nozzle having separate passages opening through the portion of its end face encircled by said peripheral zone, said end face having at least a portion thereof between the discharge ends of said nozzle passages and between said passages and the entrance end of said sprue, spaced from said post to provide a channel connecting said sprue and said nozzle passages and exposed by separation of said nozzle from said mold, said body also having therein at the surface of part and around the base of said post, a chamber of greater cross sectional area than the adjoining zones of said sprue, through which the streams of fluid from the passages of said nozzle must pass in moving along the sprue to said cavity to increase mixing of said streams before they reach said cavity, the portion of said sprue adjoining said chamber around said post opening into that chamber in a direction generally along the wall of that chamber at a distance from the exit therefrom, whereby the streams of molding material entering that chamber will tend to swirl and eddy therein before reaching the outlet therefrom into the other part of the sprue.

7. In injection molding apparatus, a mold body having therein a molding cavity and divided through said cavity into separable parts to provide for access to said cavity to remove molded objects, said body having a seat on the outer face of one of said parts and a sprue leading from said seat to said cavity, the other of said parts having a post extending into and along a portion of said sprue towards the entrance end of the latter, the periphery of said post being spaced from the periphery of said sprue, said sprue having a portion thereof extending from adjacent the base of said post along the surface of separation of said parts to said cavity, and a nozzle having a peripheral zone of its end face engaging against and removable from said seat, said nozzle having separate passages opening through the portion of its end face encircled by said peripheral zone, said end face having at least a portion thereof between the discharge ends of said nozzle passages and between said passages and the entrance end of said sprue, spaced from said seat to provide a channel connecting said sprue and said nozzle passages and exposed by separation of said nozzle from said mold, said body also having therein at the surface of part and around the base of said post, a chamber of greater cross sectional area than the adjoining zones of said sprue, through which streams of fluid from the passages of said nozzle must pass in moving along the sprue to said cavity to increase mixing of said streams before they reach said cavity, said chamber being annular in shape and approximately circular in cross section.

THOMAS F. STACY.

REFERENCES CITED

The following references are of record in the file of this patent:

UNITED STATES PATENTS

| Number | Name | Date |
|---|---|---|
| 2,296,296 | Shaw | Sept. 22, 1942 |
| 2,300,759 | Amigo | Nov. 3, 1942 |
| 2,046,592 | Tracy | July 7, 1936 |
| 2,285,370 | Staelin | June 2, 1942 |